United States Patent
Kotikalapoodi

(10) Patent No.: US 9,256,238 B1
(45) Date of Patent: Feb. 9, 2016

(54) METHOD AND APPARATUS FOR FAST, EFFICIENT, LOW NOISE POWER SUPPLY USING MULTIPLE REGULATORS

(71) Applicant: Sridhar Kotikalapoodi, Sunnyvale, CA (US)

(72) Inventor: Sridhar Kotikalapoodi, Sunnyvale, CA (US)

(*) Notice: Subject to any disclaimer, the term of this patent is extended or adjusted under 35 U.S.C. 154(b) by 102 days.

(21) Appl. No.: 13/891,646

(22) Filed: May 10, 2013

(51) Int. Cl.
  *H02M 3/158* (2006.01)
  *G05F 1/59* (2006.01)
  *H02M 1/00* (2007.01)

(52) U.S. Cl.
  CPC ......... *G05F 1/59* (2013.01); *H02M 2001/0045* (2013.01)

(58) Field of Classification Search
  CPC ....... H03G 3/3042; H03G 3/20; H03G 99/00; H04B 1/62; H02M 2001/0045
  USPC .......................................... 323/266, 284–285
  See application file for complete search history.

(56) References Cited

U.S. PATENT DOCUMENTS

| | | | |
|---|---|---|---|
| 6,229,289 B1* | 5/2001 | Piovaccari et al. | 323/268 |
| 6,788,033 B2* | 9/2004 | Vinciarelli | 323/225 |
| 6,984,969 B1* | 1/2006 | Liu et al. | 323/286 |
| RE41,061 E * | 12/2009 | Zinn | 323/266 |
| 7,759,915 B2* | 7/2010 | Ganti et al. | 323/268 |
| 2002/0028700 A1* | 3/2002 | Kato | 455/572 |
| 2006/0250825 A1* | 11/2006 | Grigore | 363/21.01 |
| 2012/0313701 A1* | 12/2012 | Khlat et al. | 330/127 |
| 2013/0094553 A1* | 4/2013 | Paek et al. | 375/222 |

* cited by examiner

*Primary Examiner* — Harry Behm
*Assistant Examiner* — Peter Novak
(74) *Attorney, Agent, or Firm* — Heimlich Law, PC; Alan Heimlich, Esq.

(57) ABSTRACT

A method and apparatus for fast, efficient, low noise power supply have been disclosed. In one implementation a switching power supply and a linear regulator provide efficiency and rapid response.

12 Claims, 8 Drawing Sheets

METHOD AND APPARATUS FOR FAST, EFFICIENT, LOW NOISE POWER SUPPLY USING MULTIPLE REGULATORS

RELATED APPLICATION

The present Application for Patent is related to U.S. patent application Ser. No. 13/891,664 titled "Method and Apparatus for Fast, Efficient, Low Noise Power Supply" filed May 10, 2013 pending by the same inventor which is hereby incorporated herein by reference.

FIELD OF THE INVENTION

The present invention pertains to power supplies. More particularly, the present invention relates to Method and Apparatus for Fast, Efficient, Low Noise Power Supply.

BACKGROUND OF THE INVENTION

A fast response and efficient power supply is needed for many electronic devices. For example, if the RF (Radio Frequency) Power Amplifier in a mobile phone is powered directly from a battery, the battery supply voltage may be too high, resulting in excess power dissipation in the power amplifier. This presents a technical problem for which a technical solution using a technical means is needed.

BRIEF DESCRIPTION OF THE DRAWINGS

The invention is illustrated by way of example and not limitation in the figures of the accompanying drawings in which.

DETAILED DESCRIPTION

The invention, in one embodiment, is a power supply which provides a reduced voltage which results in a more efficient power amplifier resulting in longer battery run time.

In one embodiment of the invention as applied to, for example RF power amplifiers, there is provided a power supply which can change its output voltage fast enough to track the rapidly changing power requirements of the power amplifier in real time.

In one embodiment of the invention, linear regulators are fast and used so that they are more efficient than a pure linear regulator approach. That is, in one embodiment of the invention without using a pure linear regulator for full power a more efficient approach is used.

In one embodiment of the invention, switch mode power supplies are efficient and used so that they are faster than a pure switch mode power supply approach. That is, in one embodiment of the invention without using a pure switch mode power supply for full power a faster power supply response is provided.

In one embodiment of the invention, without increasing the switching frequency of the switch mode supply which increases switching losses and hence decreases the efficiency is provided a fast responding power supply.

In one embodiment of the invention, without placing a switching regulator output to directly couple to a linear regulator output in parallel a fast responding power supply is described.

In one embodiment of the invention, without placing a switching regulator output to directly couple to a linear regulator output in parallel a more efficient power supply than the linear regulator with push-pull output is provided without the need for a large amount of excess current to cancel the inductor ripple current at the switching frequency of the switcher.

Figure 3:
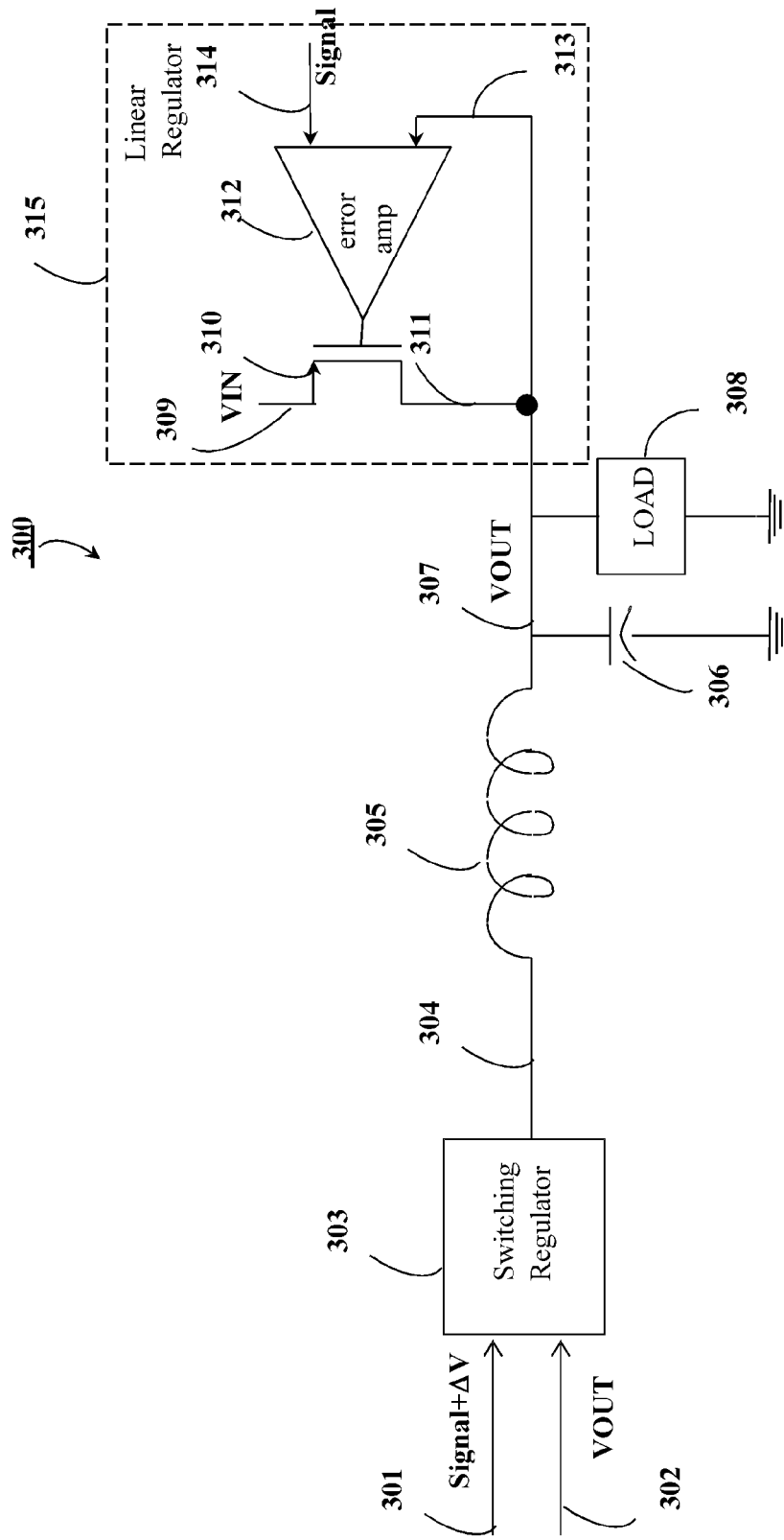
FIG. 3 illustrates one embodiment of the invention.

FIG. 3 illustrates, generally at 300, one embodiment of the invention. The power supply system 300 includes a low-speed power supply 303 (for example, but not limited to, a buck type switching power supply with switching regulator output 304, inductor 305, and output capacitor 306), and a high speed power supply 315 with only a pull-up device 310 coupled to Vin 309, and the output 311 coupled to output VOUT 307 the outputs tied together. The low speed supply regulates the output by sensing the output through sense network 302 and comparing it to signal with added offset 301. The high speed supply 315 regulates the output by sensing the output through sense network 313 and comparing it with signal 314 in error amp 312. Because of the offset in the signal 301, the low speed supply 303 regulates the output 307 to Load 308 at a higher voltage than the high speed supply 315. The high speed supply 315 has only pull-up device 310 but cannot pull down VOUT 307, therefore for DC (direct current) and low frequencies to which the low speed supply 303 can respond, the low speed power supply 303 dominates and regulates VOUT 307. However, if the signal changes fast, the low speed power supply 303 cannot respond and the load 308 will pull VOUT 307 down. Since the high speed supply 315 can respond fast enough and it has pull-up capability, it will prevent VOUT 307 from falling by pulling it up through pull-up device 310 and regulates VOUT 307. Thus at high frequencies, the high speed supply 315 dominates and regulates VOUT 307.

In one embodiment of the invention, for example as shown in FIG. 3 the power supply is efficient for DC and low frequencies through the use of switch mode power supply and fast enough to respond to high frequency signals through the use of linear regulator (pull up only).

In one embodiment of the invention, for example as illustrated in FIG. 3, fast response and efficiency is achieved by not supplying large excessive currents to cancel the switching supply ripple. This implementation avoids the disadvantage of excessive current supplied by a linear regulator to cancel the switch mode supply ripple current which exists in implementations where the linear regulators and switch mode regulators are directly coupled in parallel because the regulated output by the switching power supply in this implementation is offset higher than that of the linear regulator and because the linear regulator can only pull-up but not pull down.

While not germane to understanding or implementing the invention, one of skill in the art will appreciate that there are several ways to implement the offset ΔV to the signal 301. For example, it could be implemented by using different devices sizes for the input differential pair of the error amplifier in the input stage of the switching mode power supply 303. It could be implemented by a summing amplifier, etc.

Likewise there are several ways to implement the feedback networks. For example, the feedback network 302 and 313 for the regulators 303 and 313 respectively could just be a direct electrical connection to the output 307 or could include a resistor divider network from VOUT 307 to ground with the sense signals coming from the divided down version of the output. Another way to implement the offset $\Delta V$ to the signal 301, is to have the resistor divider ratio for the feedback signal 302 and 313 come from different resistor tap points i.e. in this case $\Delta V$ is scaled with respect to the signal rather than a fixed offset.

Figure 4:
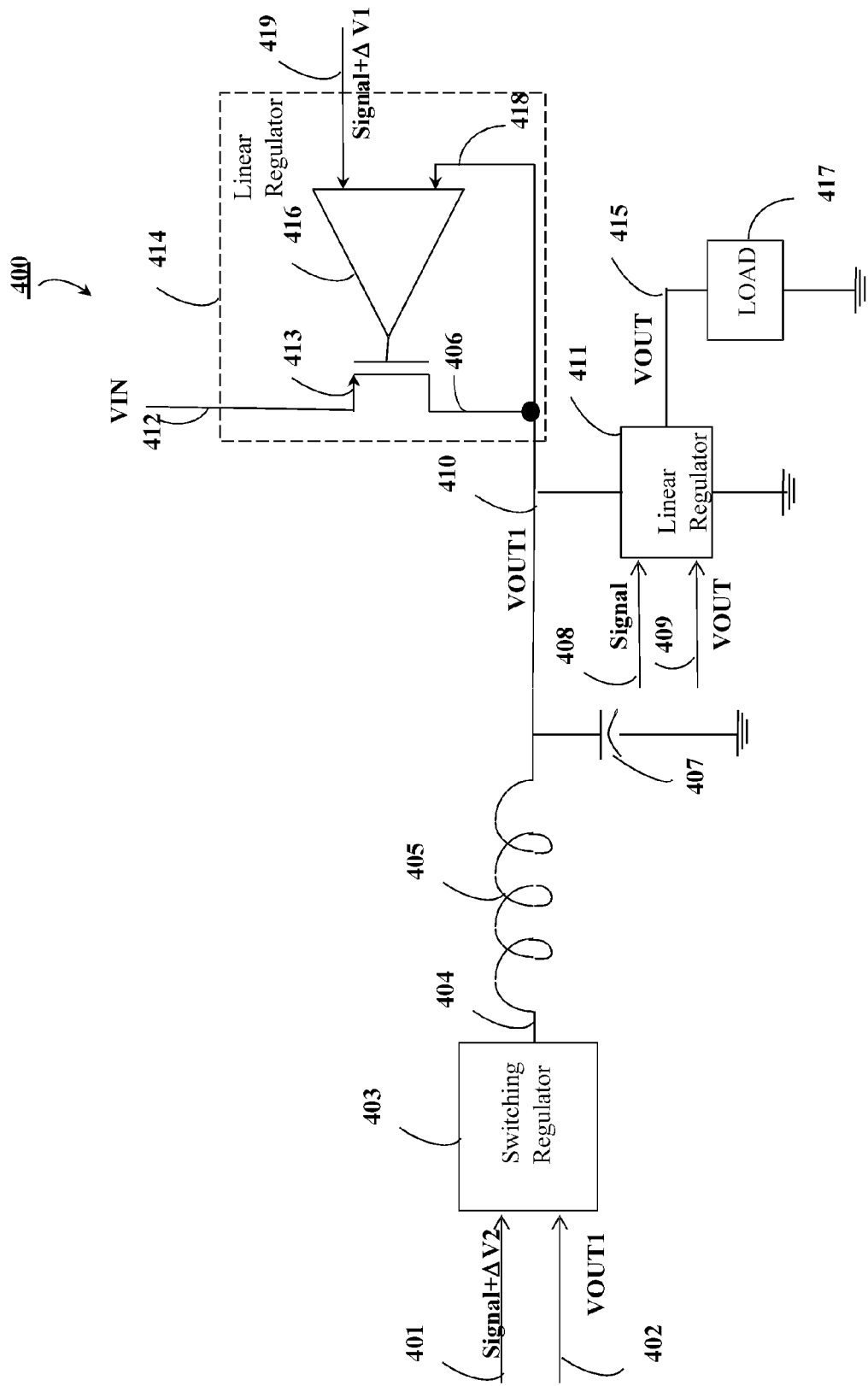
FIG. 4 illustrates a second embodiment of the invention.

FIG. 4 illustrates, generally at 400, one embodiment of the invention. The power supply system 400 is similar to the power supply system 300 of FIG. 3 in some respects and has the addition of the linear regulator 411 between the load 417 at VOUT 415 and the output VOUT1 410 which corresponds to the output VOUT 307 in FIG. 3. The linear regulator 411, in one embodiment, is a low drop-out regulator with a push-pull output, i.e. it can both source and sink currents and has a wide bandwidth. Control inputs to 411 are the signal 408 and VOUT 409. The purpose of this linear regulator 411 is to provide isolation of the switching noise of the switching regulator 403 from the load 417. Similar to the power supply 300 in FIG. 3, the switching regulator 403 is slow response, but efficient switch mode supply (with switching regulator output 404, an inductor 405, and capacitor 407) which regulates output VOUT1 410 at a higher voltage than that of high speed linear regulator 414 as the signal input 401 has an offset $\Delta V2$ which is higher than the offset $\Delta V1$ of the signal 419, input to the linear regulator 414. The low speed supply regulates the output by sensing the output through sense network 402 and comparing it to signal with added offset 401. The high speed power supply 414 has a pull-up device 413 coupled to VIN 412, and the output 406 coupled to output VOUT1 410. The high speed supply 414 regulates by sensing the output through sense network 418 and comparing it with signal plus $\Delta V1$ 419 in amp 416. Since for DC and low frequencies the VOUT1 410 is regulated by the switch mode supply 403, VOUT1 410 has the switching ripple voltage at the switching frequency present in the switch mode supply 403. Some RF power amplifier loads may couple this ripple frequency to the transmitted power, thus not meeting noise requirements. The linear regulator 411 takes this VOUT1 410 as the input and provides output VOUT 415 which doesn't have the switching frequency ripple because of the power supply rejection ratio (PSRR) of the linear regulator 411.

The offset $\Delta V2$ between the signals 401 and signal 408 is chosen to optimize the efficiency of the power supply 400 and ripple rejection of the linear regulator 411. The higher the $\Delta V2$ the better the ripple rejection of the linear regulator 411 however more power is dissipated across this linear regulator 411.

Figure 5:
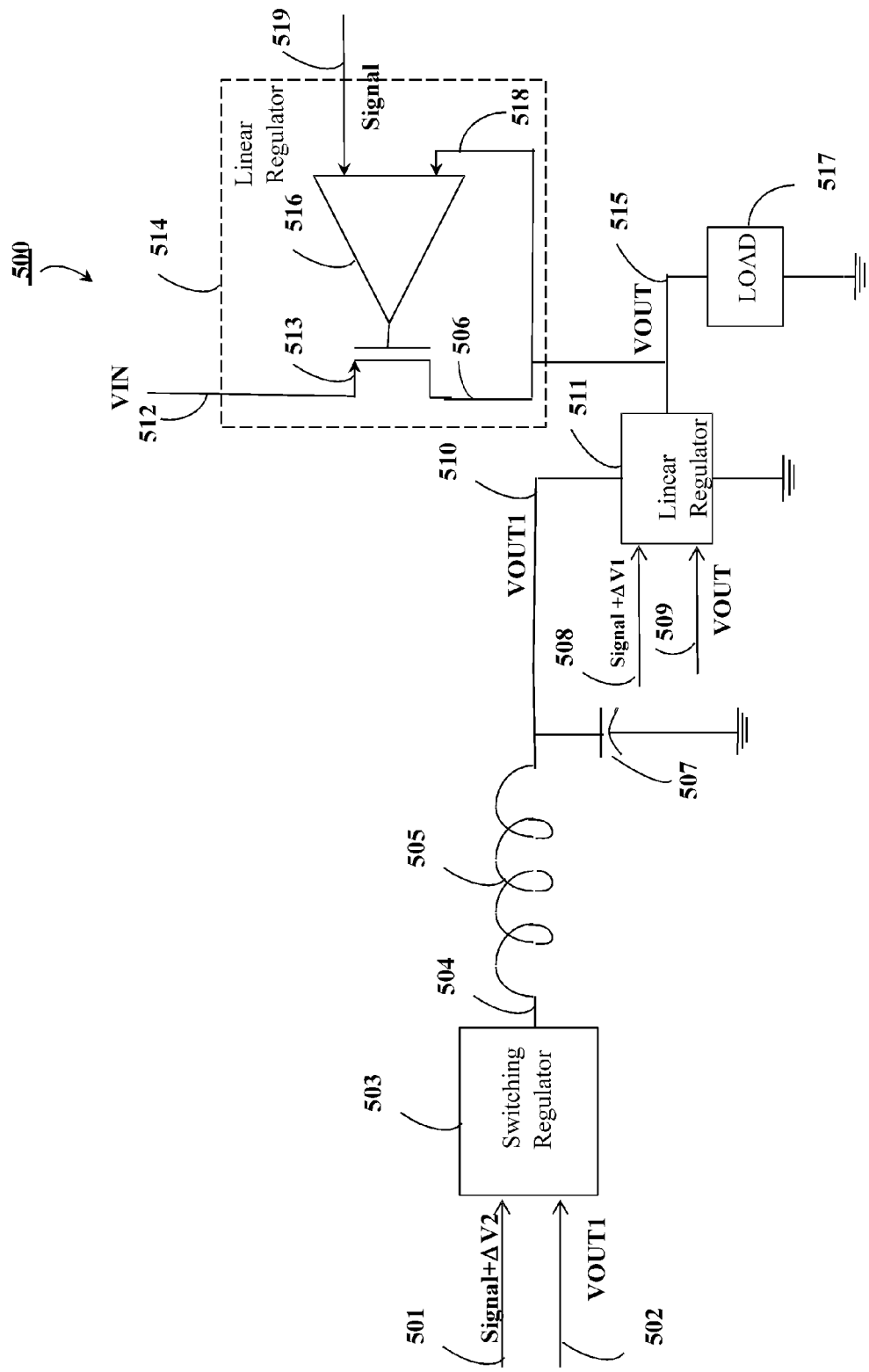
FIG. 5 illustrates a variation of one embodiment of the present invention.

In one embodiment of the invention, for example as illustrated in FIG. 4, when the load voltage VOUT 415 which is proportional to the signal 408 is low, the switching power transistors of the switcher 403 could be disabled or scaled down to minimize switching losses as they become significant compared to the load at low signal levels. In this case, the load 417 can be directly supplied by either the linear regulator 414 or even this linear regulator 414 and linear regulator 411 could be disabled and the load directly powered from VIN 412 to improve efficiency at very light loads FIG. 5 illustrates, generally at 500, one embodiment of the invention. The power supply system 500 is similar to the power supply system 400 of FIG. 4 in some respects and has a different connection at VOUT 515 and VOUT1 510. The linear regulator 511 is between the load 517 at VOUT 515 and the output VOUT1 510 The linear regulator 511, in one embodiment, is a low drop-out regulator with a push-pull output, i.e. it can both source and sink currents and has a wide bandwidth. Control inputs to 511 are the signal plus $\Delta V1$ 508 and Vout 509. The purpose of this linear regulator 511 is to provide isolation of the switching noise of the switching regulator 503 from the load 517. Similar to the power supply 400 in FIG. 4, the switching regulator 503 is a slow response, but efficient switch mode supply (with switching regulator output 504, an inductor 505, and capacitor 507) which regulates output VOUT1 510 at a higher voltage than that of signal 508 because offset $\Delta V2$ is higher than the offset $\Delta V1$ of the signal 508 input to the linear regulator 511. The low speed supply regulates the output by sensing the output through sense network 502 and comparing it to signal with added offset 501. The high speed power supply 514 has a pull-up device 513 coupled to Vin 512, and the output 506 coupled to output VOUT 515. The high speed supply 514 regulates by sensing the output through sense network 518 and comparing it with signal 519 in amp 516. Since for DC and low frequencies the VOUT1 510 is regulated by the switch mode supply 503, VOUT1 510 has the switching ripple voltage at the switching frequency present in the switch mode supply 503. Some RF power amplifier loads may couple this ripple frequency to the transmitted power, thus not meeting noise requirements. The linear regulator 511 takes this VOUT1 510 as the input and provides output VOUT 515 which doesn't have the switching frequency ripple because of the power supply rejection ratio (PSRR) of the linear regulator 511.

In one embodiment of the invention, for example as illustrated in FIG. 5 a variation of the power supply system of the present invention is disclosed. The power supply system 500 is substantially similar to the power supply system 300 and 400. It is slightly different from the power supply 400 of FIG. 5 because the linear regulator 514 of FIG. 5 is coupled to the output VOUT 515 unlike the linear regulator 414 of FIG. 4 which is coupled to VOUT1 410 rather than the output VOUT 515.

While not germane to the operation or techniques disclosed, one of skill in the art will appreciate that the devices types of devices, for example, as shown at 310, 413, 513 may be fabricates in different polarities as well as technology types, for example, but not limited to CMOS (complementary metal oxide semiconductor (MOS)) devices, Bipolar devices, DMOS (double diffused MOS) devices, NMOS (n-type MOS), PMOS (p-type MOS) devices, etc. Additionally the power systems of the present invention can be implemented in CMOS, BiCMOS (bipolar CMOS), BCD (BiCMOS and Bipolar, CMOS and DMOS), GaAs (gallium arsenide), SOI (silicon on insulator), or other processes.

Figure 6:
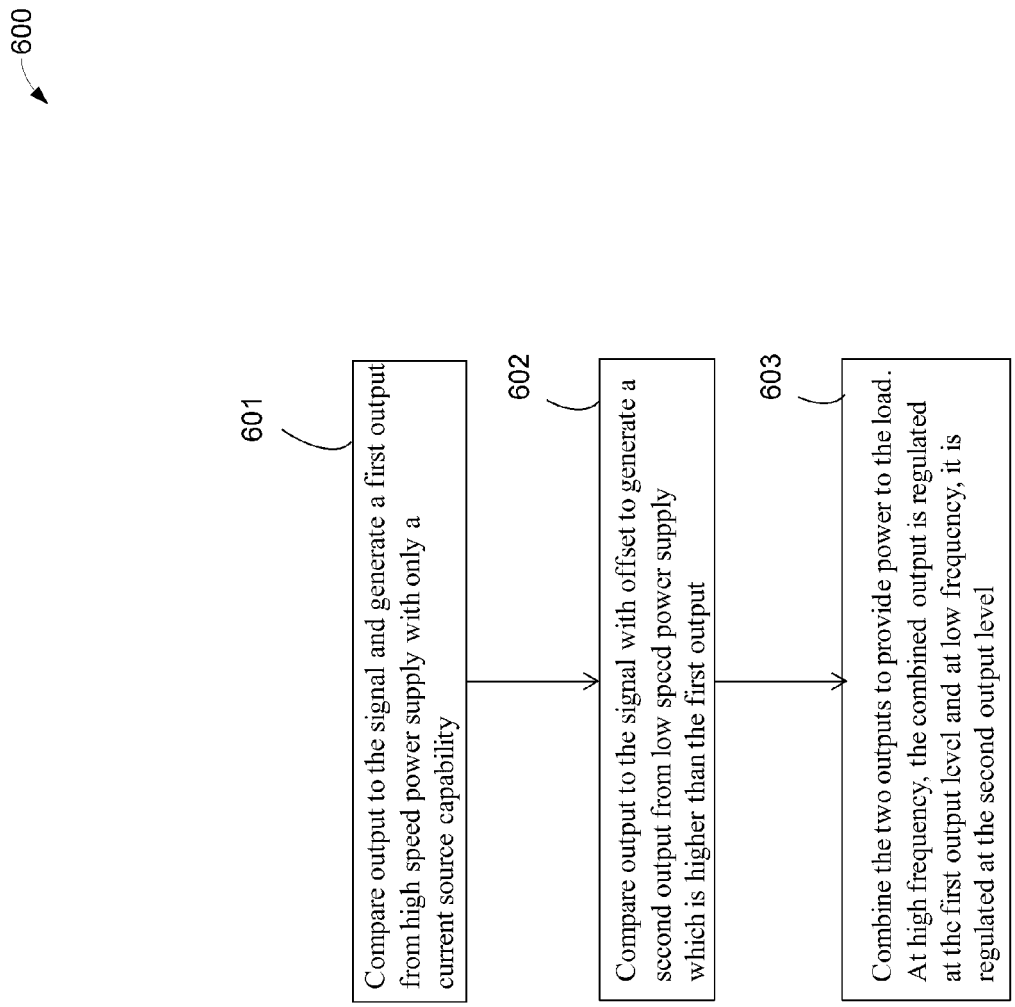
FIG. 6 illustrates one embodiment of the invention in flow chart form.

FIG. 6 illustrates, generally at 600, one embodiment of the invention. At 601 Compare output to the signal and generate a first output from high speed power supply with only a current source capability. At 602 Compare output to the signal with offset to generate a second output from low speed power supply which is higher than the first output. At 603 Combine the two outputs to provide power to the load. At high frequency, the combined output is regulated at the first output level and at low frequency, it is regulated at the second output level.

In one embodiment of the invention, for example FIG. 6, illustrates a method of generating power from the power supply according to the present invention. Referring to, for example, FIG. 6 together with FIG. 3, the high speed power supply 315 in FIG. 3 generates the first output in 601, the low speed supply 303 generates the second output in 602 and the combined output power to the load in 603 is provided at the node VOUT 307 in FIG. 3.

Figure 7:
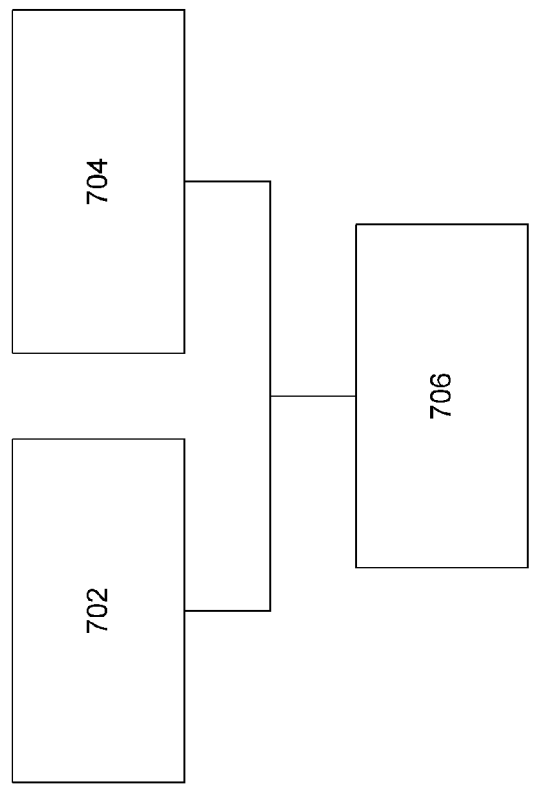
FIG. 7 illustrates one embodiment of the invention in block form.

FIG. 7 illustrates, generally at 700, one embodiment of the invention. At 706 is a load that varies in response to a signal input. At 702 is a power supply that has frequency response up to a first frequency. Thus when the signal input to 706 is at or below this first frequency power supply 702 is capable of responding and providing power to load 706. When the signal frequency is above the first frequency then power supply 702 is not capable of responding fast enough and supplying sufficient power to load 706 and this is when power supply 704 supplies additional power needed. That is, power supply 704 operates at the first frequency and above. Thus load 706 will be supplied sufficient power.

In one embodiment of the invention, for example, as illustrated in FIG. 7, power supply 702 may be a switching type supply which has good efficiency but a slow response whereas power supply 704 may be a linear type supply which has lower efficiency but a faster response.

Figure 8:
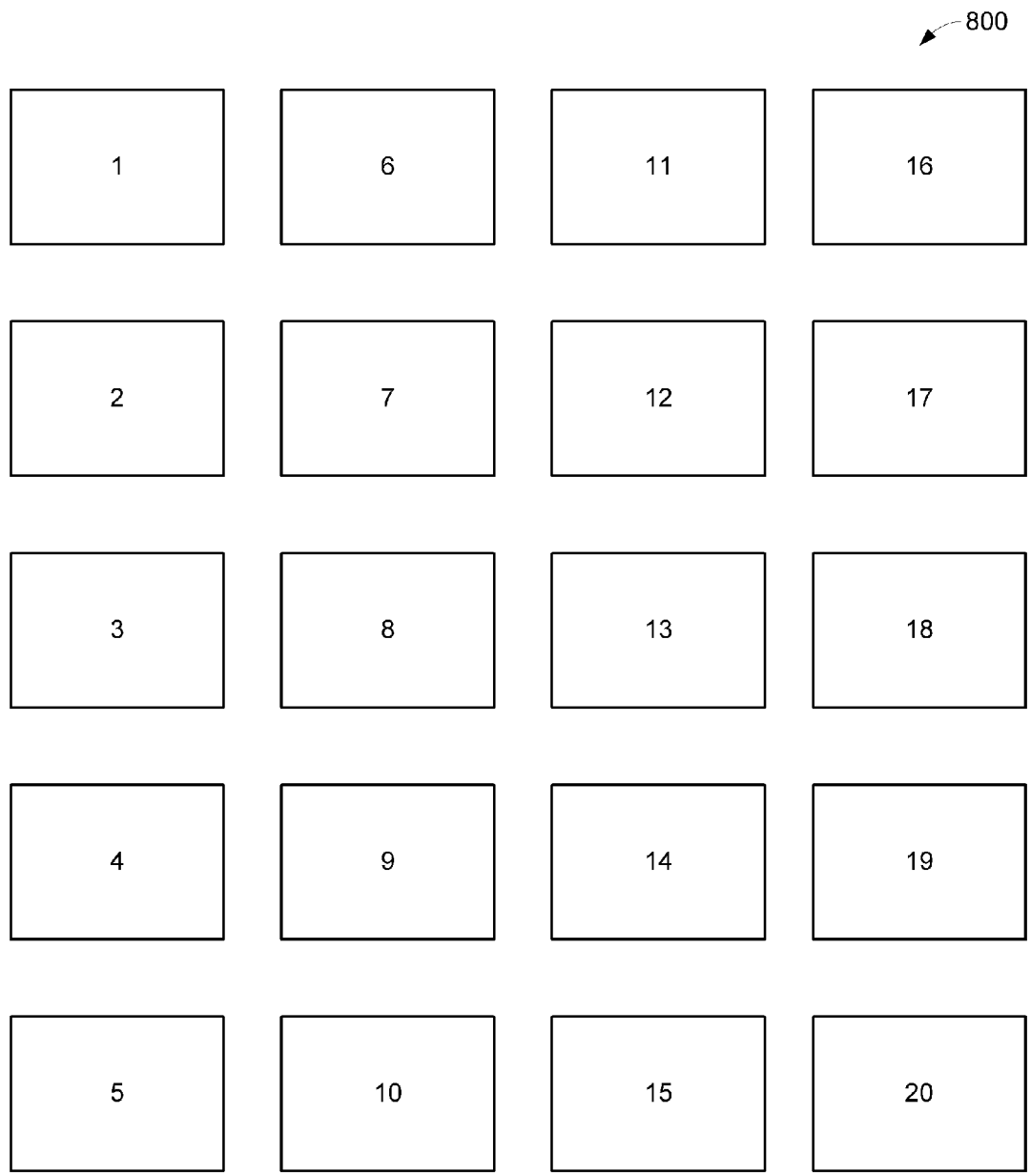
FIG. 8 illustrates various embodiments of the invention.

FIG. 8 illustrates various embodiments of the invention as indicated below.

Illustrated generally at box 1. An apparatus comprising: a first voltage regulator regulating a first output at a first output voltage; a second voltage regulator regulating a second output at a second output voltage; wherein said first output and said second output are connected in parallel to provide a combined voltage output.

Illustrated generally at box 2. The apparatus of box 1 wherein said first voltage regulator has a first frequency response and said second voltage regulator has a second frequency response and wherein said first frequency response is less than said second frequency response.

Illustrated generally at box 3. The apparatus of box 2 wherein said second voltage regulator only has voltage pull up capability.

Illustrated generally at box 4. The apparatus of box 3 wherein said first output voltage is higher than said second output voltage.

Illustrated generally at box 5. The apparatus of box 3 further comprising a third voltage regulator, said third voltage regulator connected to said combined voltage output and regulating a third output at a third output voltage.

Illustrated generally at box 6. The apparatus of box 5 wherein said first output voltage is higher than said second output voltage, and said first output voltage is higher than said third output voltage.

Illustrated generally at box 7. The apparatus of box 4 wherein said first voltage regulator is a switching mode power supply.

Illustrated generally at box 8. The apparatus of box 7 wherein said second voltage regulator is a linear regulator.

Illustrated generally at box 9. The apparatus of box 4 wherein when said signal voltage drops below a predetermined voltage said first voltage regulator is turned off.

Illustrated generally at box 10. The apparatus of box 6 wherein when said signal voltage drops below a predetermined voltage said first voltage regulator is turned off.

Illustrated generally at box 11. The apparatus of box 6 wherein said first voltage regulator is a switching voltage regulator and said second voltage regulator is a first linear voltage regulator and said third voltage regulator is a second linear voltage regulator.

Illustrated generally at box 12. An apparatus comprising: a first voltage regulator regulating a first output at a first output voltage; a second voltage regulator regulating a second output at a second output voltage; a third voltage regulator, said third voltage regulator connected to said first output and regulating a third output at a third output voltage; wherein said second output and third second output are connected in parallel to provide a combined voltage output.

Illustrated generally at box 13. The apparatus of box 12 wherein said first output voltage is greater than said second output voltage, and said first output voltage is greater than said third output voltage.

Illustrated generally at box 14. The apparatus of box 13 wherein said second voltage regulator only has voltage pull up capability.

Illustrated generally at box 15. The apparatus of box 12 wherein said first voltage regulator has a first frequency response and said third voltage regulator has a second frequency response wherein said first frequency response is less than said second frequency response.

Illustrated generally at box 16. The apparatus of box 15 wherein when said signal voltage drops below a predetermined voltage an entity is turned off selected from the group consisting of said first voltage regulator, said third voltage regulator, and said first voltage regulator and said third voltage regulator.

Illustrated generally at box 17. A method comprising: regulating a first output, said first output having a first output voltage; regulating a second output, said second output having a second output voltage; connecting said first output to said second output; and wherein said first output voltage is greater than said second output voltage.

Illustrated generally at box 18. The method of box 17 wherein said second output has only a pull-up capability.

Illustrated generally at box 19. The method of box 17 further comprising: receiving said first output and regulating a third output, said third output having a third output voltage; and wherein said first output voltage is higher than the said third output voltage.

Illustrated generally at box 20. A method comprising: comparing a first regulator output to a signal and generating a first output from a high speed power supply, said high speed power supply only having a current source capability; comparing a second regulator output to said signal plus an offset and generating a second output from a low speed power supply, said second output higher than said first output; and combining said first output and said second output to provide power to a load wherein when said signal is at a high frequency said combined output is regulated primarily by said high speed power supply and when said signal is at a low frequency said combined output is regulated primarily by said low speed power supply.

Thus a method and apparatus for fast, efficient, low noise power supply have been described.

Because of the high speeds and noise considerations in embodiments of the present invention (for example, power supply variations) specialized hardware is required.

Figure 1:
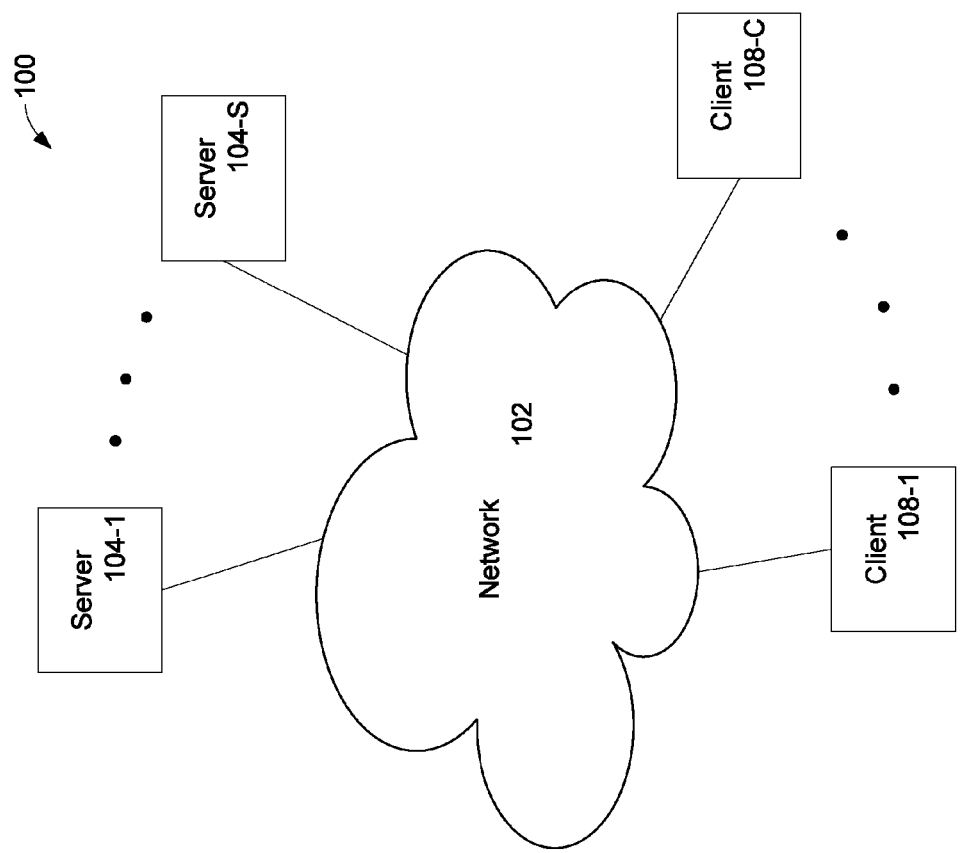
FIG. 1 illustrates a network environment in which the method and apparatus of the invention may be used.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
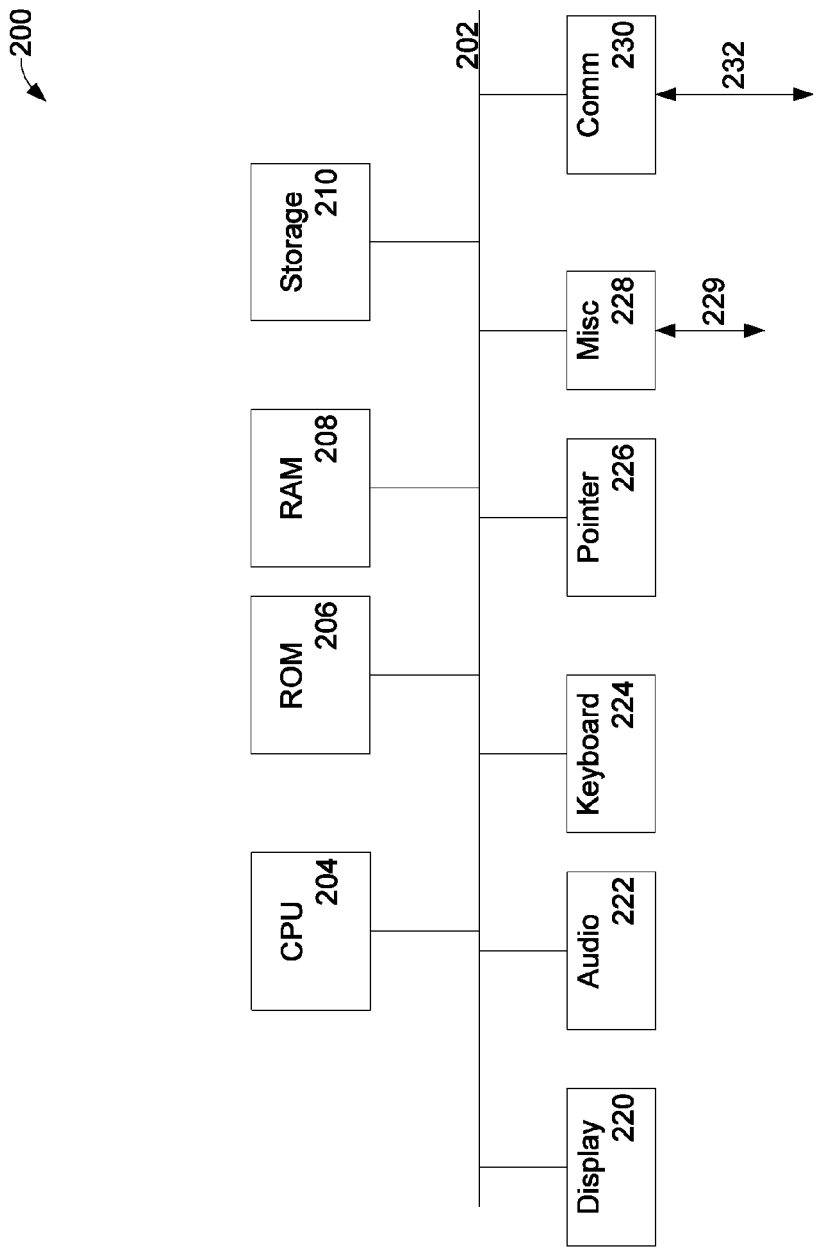
FIG. 2 is a block diagram of a computer system in which some embodiments of the invention may be used.

FIG. 2 is a block diagram of a computer system 200 which some embodiments of the invention may employ parts of in conjunction with required specialized hardware and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be accessed and/or controlled. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be accessed and/or controlled by essentially any type of communicating means or device whether local or remote, such as a LAN, a WAN, a system bus, etc. For example, a network connection which communicates via for example wireless may control an embodiment of the invention having a wireless communications device. For example, Radio Frequency Power Amplifiers in the wireless communication devices need a fast very efficient, low noise power supply. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228 via link 229, and communications 230 via port 232. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc., all non-transitory medium. Display 220 might be, for example, used by an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate non-transitory physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a non-transitory computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of non-transitory media suitable for storing electronic instructions either local to the computer or remote to the computer.

The techniques presented herein are specifically related to particular computer or other apparatus. A specialized apparatus to perform the required methods is required. For example, any of the methods according to the present invention can be implemented in hard-wired circuitry specifically designed for the functionality disclosed, or by programming special hardware having, for example, in one embodiment, a particular machine such as a computer (or CPU) specifically designed with a 4 bit or greater barrel shift register and a carry look ahead arithmetic logic unit. As disclosed Applicant submits that any results are tied to a particular machine or apparatus and/or transform a particular article into a different state or thing and that such particulars and/or things are non-trivial. For example, in FIG. 2 at 220 is a display. The results of the specialized machine may return an electronic value and such a value can be stored in hardware on the specialized machine and transformed into a graphical representation that can be displayed to a user of the computer. For example, in one embodiment, the returned value may be stored as a group of physical electrons on a trapped gate of a flash memory device. These physical electrons may then be transformed into a graphical representation, for example, by twisting the molecules of a liquid crystal display so that a carrier signal can be modulated and produces on reception a molecular change in a rod and cone receptor of a human user to produce physical electrons thus producing a tangible useful result and transformation tied to a particular machine such as a computer specifically designed with a 4 bit or greater barrel shift register and a carry look ahead arithmetic logic unit. For example the specialized hardware is required for logical operations and comparisons of values. For example, in one embodiment, the returned value may be stored as a series of holes on a paper tape that may be read by a person (e.g. a blind person) by tactile sensation (e.g. output from a KSR-33 Teletype). As disclosed Applicant submits that these results are tied to a particular machine or apparatus and/or transform a particular article into a different state or thing and that such particulars and/or things are non-trivial and as such satisfy Bilski.

The methods of the invention may be implemented using computer software on the specialized hardware as noted supra. If written in a programming language conforming to a recognized standard, sequences of instructions designed to implement the methods can be compiled for execution on the specialized hardware. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action and produce a tangible concrete non-transitory result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a specialized computer system in which the techniques of the present invention may be practiced as well as implemented as an embodiment).

A machine-readable medium is understood to include any non-transitory mechanism for storing or transmitting information in a form readable by a machine (e.g., a computer). For example, a non-transitory machine-readable medium includes read only memory (ROM); random access memory (RAM); magnetic disk storage media; optical storage media; flash memory devices; devices having non-transitory storage.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus while particular embodiments and applications of the present invention have been illustrated and described, it is to be understood that the invention is not limited to the precise construction and components disclosed herein. Various modifications, changes and variations which will be apparent may be made in the arrangement, operation and details of the method and apparatus of the present invention disclosed herein without departing from the spirit and scope of the invention as defined in the claims.

What is claimed is:

1. An apparatus comprising:
a first voltage regulator regulating a first output at a first output voltage;
a second voltage regulator regulating a second output at a second output voltage;
wherein said first output and said second output are connected in parallel to provide a combined voltage output;
a third voltage regulator, said third voltage regulator connected to said combined voltage output and regulating a third output at a third output voltage;
wherein said first voltage regulator has a first frequency response and said second voltage regulator has a second frequency response and wherein said first frequency response is less than said second frequency response;
wherein said second voltage regulator only has voltage pull up capability; and
wherein said first output voltage, said second output voltage, and said third output voltage depend on at least in part on a voltage level of a common input signal.

2. The apparatus of claim 1 wherein said first output voltage is higher than said second output voltage.

3. The apparatus of claim 1 wherein said first output voltage is higher than said second output voltage, and said first output voltage is higher than said third output voltage.

4. The apparatus of claim 2 wherein said first voltage regulator is a switching mode power supply.

5. The apparatus of claim 4 wherein said second voltage regulator is a linear regulator.

6. The apparatus of claim 2 wherein when a signal voltage drops below a predetermined voltage said first voltage regulator is turned off.

7. The apparatus of claim 3 wherein when a signal voltage drops below a predetermined voltage said first voltage regulator is turned off.

8. The apparatus of claim 3 wherein said first voltage regulator is a switching voltage regulator and said second voltage regulator is a first linear voltage regulator and said third voltage regulator is a second linear voltage regulator.

9. A method comprising:
regulating a first output, said first output having a first output voltage;
regulating a second output, said second output having a second output voltage;
connecting said first output to said second output;
regulating a third output, said third output having a third output voltage;
wherein said first output has a first frequency response and said second output has a second frequency response and wherein said first frequency response is less than said second frequency response;
wherein said second output has only a pull-up capability; and
wherein said first output voltage, said second output voltage, and said third output voltage depend on at least in part on a voltage level of a common input signal.

10. The method of claim 9 wherein said first output voltage is greater than said second output voltage.

11. The method of claim 9 wherein said first output voltage is higher than said third output voltage.

12. A method comprising:
comparing a first regulator output to a signal and generating a first output from a high speed power supply, said high speed power supply only having a current source capability;
comparing a second regulator output to said signal plus an offset and generating a second output from a low speed power supply, said second output higher than said first output; and
combining said first output and said second output to provide power to a load wherein when said signal is at a high frequency said combined output is regulated primarily by said high speed power supply and when said signal is at a low frequency said combined output is regulated primarily by said low speed power supply.

* * * * *